Patented Mar. 5, 1940

2,192,197

UNITED STATES PATENT OFFICE 2,192,197

DINITRO-ALKYL-PHENOL

Lindley E. Mills and Bruce L. Fayerweather, Midland, Mich., assignor to The Dow Chemical Company, Midland, Mich., a corporation of Michigan No Drawing. Application September 3, 1936, Serial No. 99,240

11 Claims. (Cl. 260—622)

This invention concerns dinitro-alkyl-phenol compounds, and, more particularly, 2,4-dinitro-alkyl-phenolic compounds having the following formula:

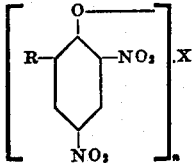

wherein R represents an alkyl radical containing 3 or more carbon atoms, X represents hydrogen or a metal selected from the group consisting of the alkali and alkaline earth metals, and $m$ is an integer corresponding to the valency of X. We have prepared representative members of the above class of compounds, determined certain of their physical properties whereby they can be readily identified, and have found them useful as components of insecticidal compositions and as pharmaceutical products.

The 2,4-dinitro-6-alkyl-phenols can be prepared by reacting a 6-alkyl-phenol with concentrated sulphuric acid until the phenol is converted substantially to a sulphonic acid derivative. This reaction product is then dissolved in water, and sufficient nitric acid is gradually added to the solution, with agitation, to convert the sulphonic acid derivative to the desired dinitro-phenol compound. After all of the nitric acid has been added, the reaction mixture is stirred and maintained at a temperature between about 60° and about 80° C. for a suitable period of time to insure complete reaction, cooled, and the dinitro-derivative separated therefrom, e. g., by filtration, extraction with solvent, or decantation. The crude reaction product so obtained may, if desired, be further purified, as by recrystallization from an organic solvent such as ethyl alcohol, chloroform, chlorobenzene, dilute acetic acid, etc., or by preparing therefrom the corresponding sodium phenolate, which may be recrystallized from water or alcohol and thereafter acidified to recover the desired free phenolic compound.

Dinitro-6-alkyl-phenols may also be prepared by treating a glacial acetic acid solution of a suitable alkyl-phenol with concentrated nitric acid, or by slowly reacting upon a water solution of a sulphonic acid of an alkyl phenol, containing a sufficient excess of sulphuric acid, with an aqueous solution of sodium nitrate.

Alkali metal salts such as the sodium and potassium phenolates of the above dinitro-alkyl-phenol compounds are readily prepared by reacting a 2,4-dinitro-6-alkyl-phenol with a molecular equivalent of alkali metal hydroxide in hot aqueous solution and thereafter cooling the resulting orange-red reaction mixture to precipitate the desired crystalline alkali metal phenolate, which may then be recovered, as by filtration, from the aqueous reaction liquor. Alkali metal phenolates so prepared are crystalline in form, generally yellow to yellow-red in coloration, and may be further purified by recrystallization from water or alcohol.

Alkaline earth metal phenolates of the 2,4-dinitro-6-alkyl-phenols can be prepared by reacting a water-soluble salt of magnesium or calcium, such as a chloride or acetate, or an aqueous solution thereof, with a solution of an alkali metal dinitro-alkyl-phenolate, whereby the alkaline earth metal phenolate crystallizes out of solution. The above alkaline earth metal phenolates vary in color from a yellow-red to scarlet, depending upon the particular dinitro-alkyl-phenol employed as a starting material.

The following examples describe the preparation of certain representative members of our new class of compounds, but are not to be construed as limiting the invention:

Example 1

A mixture of 30 grams (0.2 mol) of 6-tertiary-butyl-phenol and 34 milliliters (0.6 mol) of 95 per cent by weight sulphuric acid was heated in a glass-lined vessel with agitation at a temperature of 60° to 70° C. for one hour. The resulting viscous, wine-red sirup was poured into 250 milliliters of water, and the clear sulphonic acid solution so formed was cooled to a temperature of approximately 70° C. 52 milliliters (0.8 mol) of 70 per cent by weight nitric acid was then added drop by drop to the sulphonic acid solution over a period of one hour, the reaction mixture being rapidly agitated and maintained at a temperature of 70° to 80° C. throughout this period. The nitration progressed smoothly, with yellow crystals of dinitro-derivative precipitating from the reaction mixture after approximately 15 milliliters of the nitric acid had been added. After all of the nitric acid had been introduced, the suspension of yellow crystals was continuously agitated for one hour at a temperature of 75° to 80° C., to insure complete reaction, and then slowly cooled to a temperature of 5° C. The mixture was filtered and the residue washed with water and air-dried. 40 grams of 2,4-dinitro-6-tertiarybutyl-phenol was obtained, which represents a yield of about 85 per cent, based on the 6-tertiarybutyl-phenol used. The pure compound melts at approximately 85° C., is substantially insoluble in water, is soluble in most organic solvents, and forms metallic salts which are brilliant red, yellow, or orange in color.

5 grams (0.02 mol) of the above-prepared 2,4-dinitro-6-tertiarybutyl-phenol, 0.965 gram (0.022 mol) of 95 per cent by weight sodium hydroxide, and 90 grams of water were mixed together and warmed to approximately 65° C. The resulting yellow-red solution on cooling precipitated out yellow-red crystals of sodium 2,4-dinitro-6-tertiarybutyl-phenolate.

The above suspension of phenolate crystals was rewarmed to 65°–75° C. and a solution of 2.3 grams of anhydrous calcium chloride in 35 grams of water was added drop by drop to the rapidly agitated mixture over a period of 30 minutes. The reaction mixture was thereafter quickly cooled to 5° C., thereby precipitating out crystalline masses of the desired calcium phenolate. This suspension was filtered and the crystalline mass so obtained washed with a small amount of water and thereafter air-dried, whereby there was obtained 5.3 grams of calcium 2,4-dinitro-6-tertiarybutyl-phenolate in the form of finely divided, light yellow crystals.

*Example 2*

13.0 grams (0.073 mol) of 6-normal-hexyl-phenol was reacted with 24 milliliters of 95 per cent by weight sulphuric acid and the resulting crystalline mass dissolved in 32 milliliters of water. A solution consisting of 14 milliliters of 70 per cent by weight nitric acid and 16 milliliters of water was then added drop by drop to the sulphonic acid solution, the reaction mixture being rapidly agitated and maintained at a temperature between about 5° and 15° C. during the addition period. After all of the nitric acid had been introduced, the reaction mixture was warmed to, and maintained at about 65° C. for 5 hours, after which a considerable excess of water was added thereto, and the resulting oily layer of organic product separated from the mass of reaction mixture by decantation. This yellow-brown, oily product was dissolved in 150 milliliters of an aqueous alkali solution containing 14 milliliters of 30 per cent by weight sodium hydroxide solution to form a red-brown sodium phenolate solution. This solution was warmed to about 75° and thereafter cooled to 5° C. The mass of small yellow crystals precipitating therefrom was filtered off, washed with a small amount of water, and re-filtered. The sodium 2,4-dinitro-6-normal-hexyl-phenolate so obtained was suspended in water and acidified to liberate the free phenol, which was in turn separated from the aqueous reaction liquor by extraction with benzene, and the benzene evaporated therefrom. The 12.5 grams of 2,4-dinitro-6-normal-hexyl-phenol product so obtained had a freezing point of 5.5° C. Upon recrystallization of the above product from petroleum ether, the desired compound was obtained in substantially pure form as yellow-brown crystals freezing at 6.2° C.

*Example 3*

14.0 grams (0.07 mol) of 6-normal-octyl-phenol was reacted with 24 milliliters of cold 95 per cent by weight sulphuric acid and the red-brown sirup resulting therefrom allowed to stand over night. The resulting crystalline mass was dissolved in 32 milliliters of water to form a sulphonate solution which was cooled to 5° C., and reacted as described in Example 2 with a solution containing 14 milliliters of 70 per cent by weight nitric acid and 16 milliliters of water. The reaction mixture was thereafter heated to 60° C. for 2 hours, allowed to stand for several days, and thereafter diluted with an excess of water to precipitate out a yellow, oily layer. This oily product was separated from the reaction mixture in the usual manner and converted to its sodium salt by reaction with a warm alcoholic solution of sodium hydroxide to form an orange-red solution of the corresponding sodium phenolate. On cooling the above solution to approximately 5° C., the solid sodium 2,4-dinitro-6-normal-octyl-phenolate was precipitated in the form of small orange plates. This solid phenoate was separated from the alcoholic mother liquor by filtration, suspended in water, and acidified to yield the free dinitro-octyl-phenol as a light yellow oil. This yellow oil was separated therefrom by extraction with benzene, and the benzene solution thereafter evaporated on the steam bath, resulting in the isolation of 13.5 grams of 2,4-dinitro-6-normal-octyl-phenol as a yellow liquid freezing at about 21° C.

Other 6-alkyl-phenols may be nitrated as described in the foregoing examples to yield compounds such as 2,4-dinitro-6-normal-butyl-phenol, 2,4-dinitro-6-isobutyl-phenol, 2,4-dinitro-6-isopropyl-phenol, 2,4-dinitro-6-normal-amyl phenol, 2,4-dinitro-6-isoamyl-phenol, 2,4-dinitro-6-secondary-amyl-phenol, 2,4-dinitro-6-tertiary-hexyl-phenol, 2,4-dinitro-6-tertiary-octyl-phenol, etc. By treatment of the above compounds with aqueous or alcoholic solutions of the alkali-metal hydroxides, such as sodium hydroxide, potassium hydroxide, ammonium hydroxide, etc., the corresponding alkali metal phenolates may be prepared, e. g., sodium 2,4-dinitro-6-normal-propyl-phenolate, sodium 2,4-dinitro-6-normal-amyl-phenolate, sodium-2,4-dinitro-6-isobutyl-phenolate, potassium 2,4-dinitro-6-tertiarybutyl-phenolate, ammonium 2,4-dinitro-6-isoamyl-phenolate, etc. Reaction of aqueous or alcoholic solutions of such alkali metal dinitro-6-alkyl-phenolates with water-soluble salts of such alkaline-earth metals as magnesium, calcium, etc., results in the formation of the corresponding alkaline earth metal phenolates, which are for the most part difficultly soluble in water and/or alcohol and may be separated from their reaction mixtures by cooling and filtration. Examples of compounds which may be readily formed in such fashion are calcium 2,4-dinitro-6-normal-butyl-phenolate, calcium 2,4-dinitro-6-isobutyl-phenolate, magnesium 2,4-dinitro-6-normal-butyl-phenolate, magnesium 2,4-dinitro-6-tertiarybutyl-phenolate, magnesium 2,4-dinitro-6-tertiary-octyl-phenolate, and calcium 2,4-dinitro-6-normal-hexyl-phenolate.

The present application is a continuation-in-part of our prior application Serial Number 56,262, filed December 26, 1935, for "2,4-dinitro-6-tertiarybutyl-phenol and method of making same."

Other modes of applying the principle of our invention may be employed instead of those explained, change being made as regards the method or compounds herein disclosed, provided the compounds stated by any of the following claims be obtained.

We therefore particularly point out and distinctly claim as our invention:

1. A compound having the following formula:

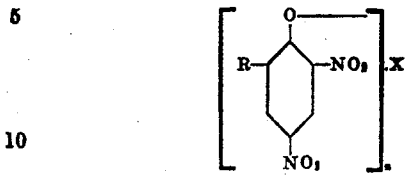

wherein R represents an alkyl radical having at least 3 carbon atoms, X represents a member of the group consisting of hydrogen and the alkali and alkaline earth metals, and $n$ is an integer corresponding to the valency of X.

2. A compound having the following formula:

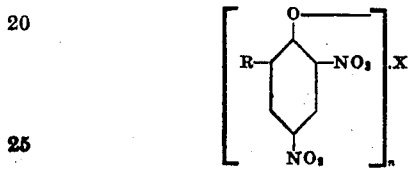

wherein R represents an alkyl radical containing from 3 to 8 carbon atoms inclusive, X represents a member of the group consisting of hydrogen and the alkali and alkaline earth metals, and $n$ is an integer corresponding to the valency of X.

3. A dinitro-alkyl-phenol having the formula:

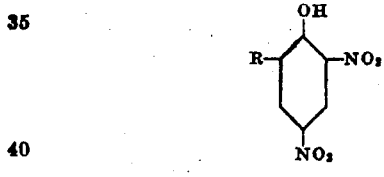

wherein R represents an alkyl radical containing at least 3 carbon atoms.

4. A dinitro-alkyl-phenol having the formula:

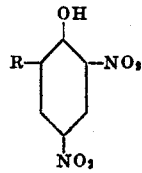

wherein R represents an alkyl radical containing from 3 to 8 carbon atoms inclusive.

5. 2,4-dinitro-6-tertiarybutyl-phenol.
6. 2,4-dinitro-6-normal-hexyl-phenol.
7. 2,4-dinitro-6-normal-octyl-phenol.
8. As new products nitrated ortho-alkyl ring compounds having an oxygen in the first position linked with a member of the group consisting of hydrogen and the alkali metals and alkaline earth metals, $NO_2$ groups in the second and fourth positions, and an alkyl group in the sixth position, said alkyl group containing more than two carbon atoms.
9. New products comprising compounds having the general formula

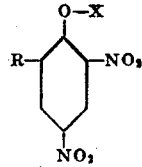

where R is an alkyl group containing more than two carbon atoms, and X is selected from the group consisting of hydrogen and the monovalent metals.

10. As new products, metal salts of 2,4-dinitro-6-alkyl-phenols having more than two carbon atoms in the alkyl group.

11. As new products, substantially pure 2,4-dinitro-6-butyl-phenols having the formula:
$C_{10}H_{11}(NO_2)_2$—OH.

LINDLEY E. MILLS.
BRUCE L. FAYERWEATHER.